(12) United States Patent
Lenczner et al.

(10) Patent No.: US 8,667,793 B2
(45) Date of Patent: Mar. 11, 2014

(54) BRAKE FLUID RESERVOIR AND INSTALLATION FOR THE MANUFACTURE OF SUCH A RESERVOIR

(75) Inventors: Sylvain Lenczner, Esbly (FR);
Jean-Michel L'Aot, Stains (FR);
Vincent Maury, Asnieres sur Seine (FR); Miguel Angel Albarran, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 973 days.

(21) Appl. No.: 12/778,420

(22) Filed: May 12, 2010

(65) Prior Publication Data
US 2010/0287930 A1    Nov. 18, 2010

(30) Foreign Application Priority Data
May 15, 2009   (FR) ...................................... 09 02382

(51) Int. Cl.
*B60T 11/26* (2006.01)
(52) U.S. Cl.
USPC .......................................................... 60/585
(58) Field of Classification Search
USPC .......................................................... 60/585
See application file for complete search history.

(56) References Cited

U.S. PATENT DOCUMENTS 4,297,846 A    11/1981  Cadeddu
4,355,512 A *  10/1982  Kubota et al. .................... 60/585
5,743,093 A *  4/1998   Nakayoku et al. ............... 60/585
7,448,211 B2 * 11/2008  Hayashi ........................... 60/585
8,037,898 B2 * 10/2011  Hayashi ........................... 60/585

FOREIGN PATENT DOCUMENTS

DE    10217619 A1    7/2003
DE    102006010815 A1    9/2007
GB    2204997 A    11/1988
GB    2230831 A    10/1990

OTHER PUBLICATIONS

FR0902382 Search Report and Written Opinion.

* cited by examiner

*Primary Examiner* — Michael Leslie
(74) *Attorney, Agent, or Firm* — Michael Best & Friedrich LLP

(57) ABSTRACT

Reservoir in which the walls (111, 121) and the partitions (112, 122) are assembled by thermowelding the edges together with the exception of the edges (113a, 123a) of the well elements (113, 123), the edge (113a) of the upper element (113) and the edge (123a) of the lower element (123) of the well (104) have complementary shapes producing, by assembly under the pressure exerted by bringing together and welding the walls (111, 121) and the partitions (113, 123) of the reservoir (100), a fluid-tight joint between the edges of the two well elements, without generating projections that are deformed toward the interior of the well.

The thermowelding hotplate (140) has a cut-out (143) along the line of the well elements (113, 123) so as to leave the edge (113a, 123a) of the well elements out of contact when the edge (111a, 121a) of the walls (111, 121) and that (112a, 122a) of the partitions (112, 122) of each of the reservoir parts (110, 120) is pressed against one face (141, 142) of the hotplate.

7 Claims, 3 Drawing Sheets

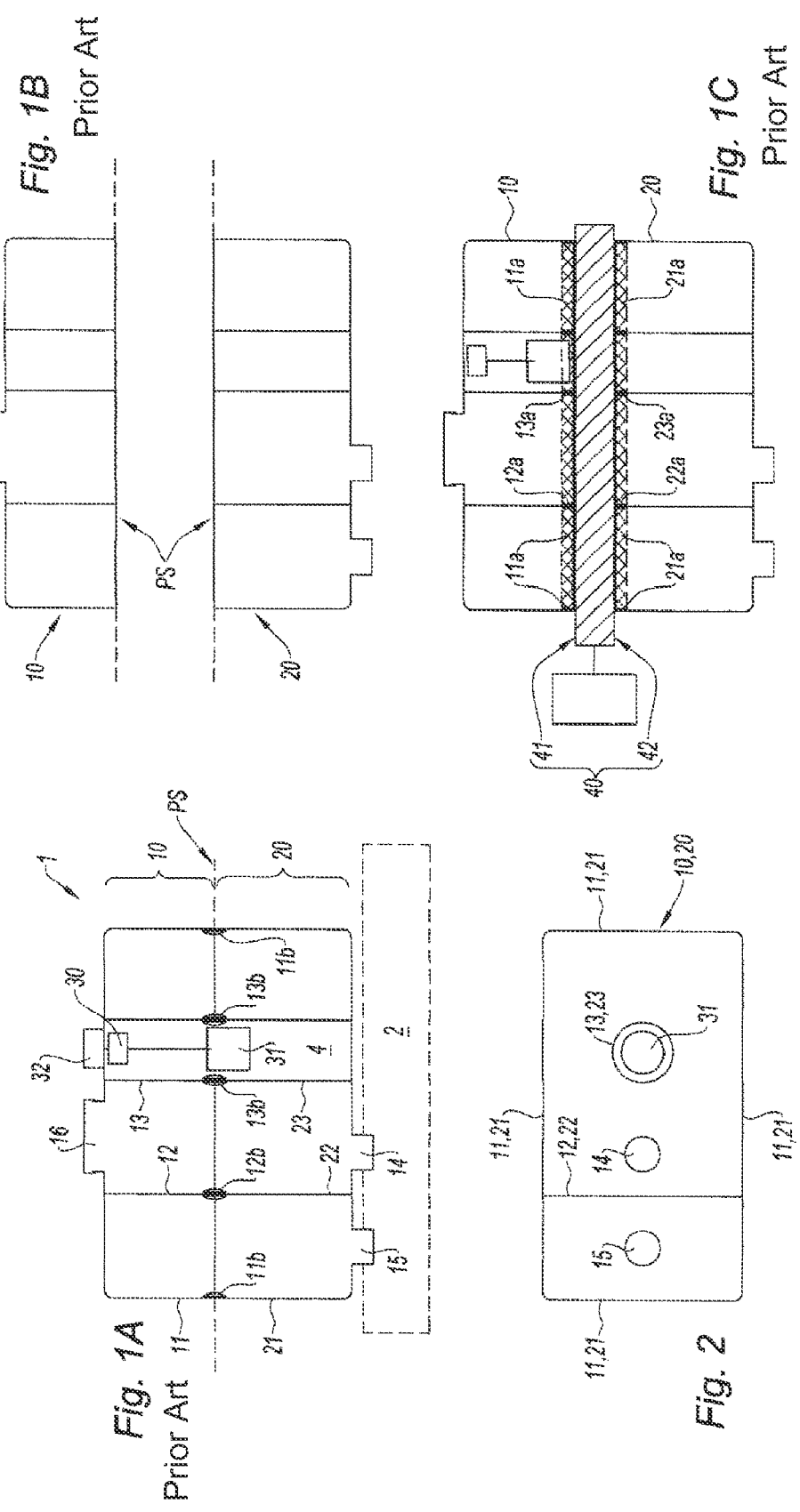

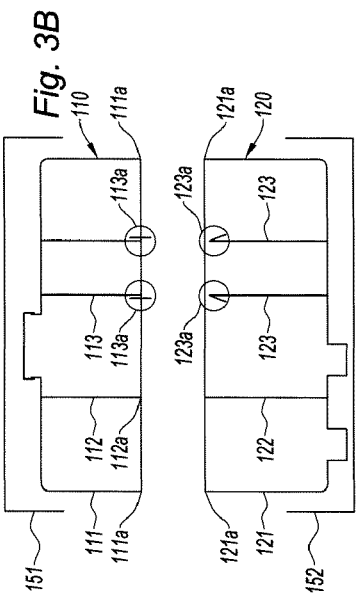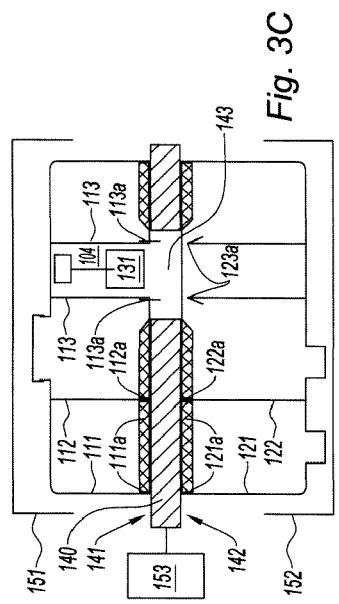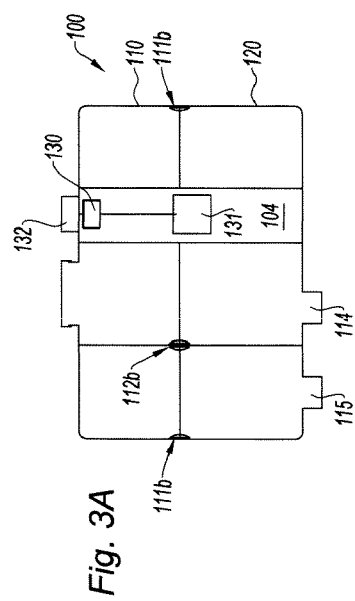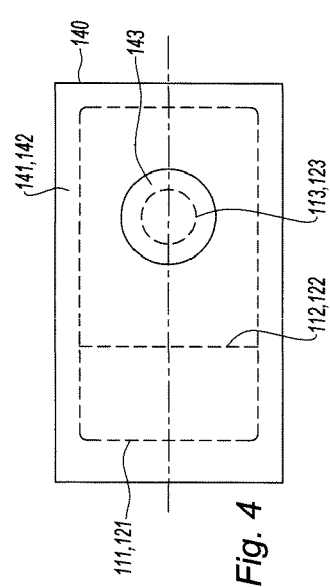

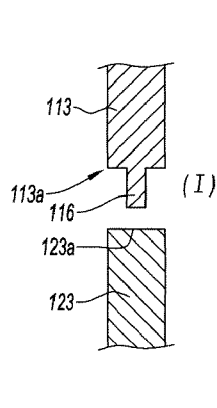
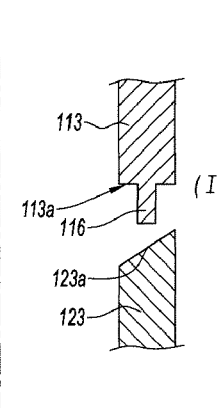
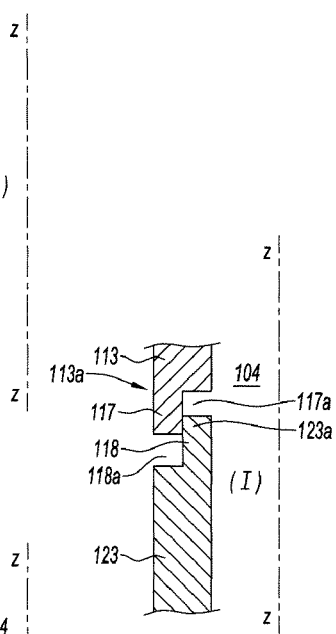
Fig. 5A  Fig. 6A  Fig. 7
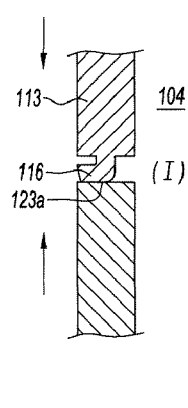
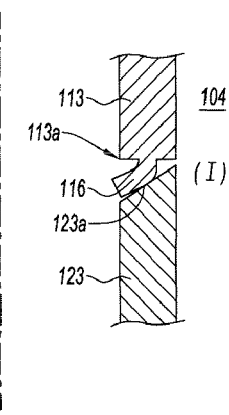
Fig. 5B  Fig. 6B

BRAKE FLUID RESERVOIR AND INSTALLATION FOR THE MANUFACTURE OF SUCH A RESERVOIR

BACKGROUND OF THE INVENTION

The present invention relates to a brake fluid reservoir and to an installation for the manufacture of such a reservoir.

The invention relates to a brake fluid reservoir combined with a tandem master cylinder, comprising a gauging well, that is fluid-tight at least in the range in which the float installed in the well for monitoring the brake fluid level in the reservoir and for generating a signal moves, the reservoir being formed of two parts, an upper part and a lower part, these each being provided with partitions and well elements which, when the two parts are assembled, make up the compartments and the gauging well, the two parts each being made of a thermoweldable plastic so that they can be assembled with one another by thermowelding the walls and partitions that compartmentalize the reservoir, by pressing together edges that have been melted beforehand.

The invention also relates to a thermowelding installation for creating a brake fluid reservoir, which reservoir is formed by using thermowelding to assemble the walls and partitions of the parts of the reservoir, which thermowelding is achieved by injecting thermoweldable plastic, the installation comprising a support to accept the upper part of the reservoir, a support to accept the lower part of the reservoir, these two supports facing one another, and a hotplate intended to be positioned between the two reservoir parts so that the edges of the walls and partitions of the two reservoir parts can be pressed against the hotplate in order to cause the edge of the two reservoir parts to melt partially, then the hotplate can be extracted from this gap and the two parts of the reservoir pressed together in order to weld them by thermowelding.

Brake fluid reservoirs of the type defined hereinabove already exist. Assembling the two parts of the reservoir using thermowelding generates welding flash. Now, although this flash is of no consequence on the walls of the reservoir and on the partitions that compartmentalize this reservoir, it may prove problematic at the gauging well that houses the float. Flash inside the well may jam or impede the movement of the float. Fitting the float inside the well of the reservoir prior to welding may also cause damage to the float as a result of its proximity to the welding hotplate. There may also be created, in addition to plastic flash at the weld, a thread of plastic which enters the well and impedes the movement of the float.

To sum up, in known brake fluid reservoirs there is a risk that the float will operate incorrectly or will behave differently inside the well, for example when the vehicle is inclined and the float therefore rests against the wall of the gauging well. Such reservoirs are known from document GB 2 204 997 A.

SUMMARY OF THE INVENTION

It is an object of the present invention to develop a brake fluid reservoir produced by assembling two reservoir parts but which avoids any risk of any change in the behavior of the float that gauges the level of brake fluid in the gauging well. It is another object of the invention to develop a thermowelding installation for manufacturing such a reservoir.

To this end, the invention relates to a brake fluid reservoir of the type defined hereinabove, characterized in that the walls and the partitions are assembled by thermowelding the edges together with the exception of the edges of the well elements, the edge of the upper element and the edge of the lower element of the well have complementary shapes producing, by assembly under the pressure exerted by bringing together and welding the walls and the partitions of the reservoir, a fluid-tight joint between the edges of the two well elements, without generating projections that are deformed toward the interior of the well.

The reservoir according to the invention has the advantage of avoiding there being anything projecting into the gauging well that could slow, jam or, more generally, upset the operation of the float, without this particular feature of the invention making the reservoir more complicated to manufacture at the time of thermowelding.

Aside from the risk of having flash or other bits projecting into the reservoir, not welding the edges of the elements that form the well also avoids there being a thread of molten product created and entering the well with the risk of impeding the operation of the float.

According to another advantageous feature, the edge of one (upper/lower) element of the well comprises a lip, and the edge of the other element of the well has a guide surface collaborating with the lip the compression of which achieves fluid-tight contact with, as appropriate, deformation of the lip toward the exterior of the gauging well.

This combination of shapes between the lip and the edge of the other element which may be straight or inclined can be reversed in this device, the lip then being provided either on the upper element or on the lower element, and the flat or inclined edge being provided on the other of the elements.

According to another advantageous feature, the edge of one (upper/lower) element of the well has an inner (outer) lip and the edge of the other element of the well has an outer (inner) lip of a cross section that at least substantially complements that of the upper edge so that assembling the two edges under pressure achieves the fluid-tight contact.

This then allows the parts to nest together and, once again, the inner lip may be provided on the upper element or the lower element with the outer lip provided on the other of the elements.

According to another feature, the upper element and the lower element of the gauging well have a height which, in combination, exceeds the height of the walls and of the partitions to be welded.

The invention also relates to an installation for thermowelding two brake fluid reservoir parts. This installation may be incorporated into the installation used for molding the two parts or may be an independent installation. This installation is characterized in that the hotplate has a cut-out along the line of the well elements so as to leave the edge of the well elements out of contact when the edge of the walls and that of the partitions of each of the reservoir parts is pressed against one face of the hotplate.

Aside from the fact that this installation heats only the edges of the outer walls and of the partitions of the parts of the reservoir, the cut-out in the hotplate avoids any radiative heating of the float of the level gauge that is installed in the upper element of the well before the two parts are assembled. This then avoids any deformation of the float that could impede its operation.

BRIEF DESCRIPTION OF THE DRAWINGS

The present invention will be described in greater detail hereinafter using some embodiments depicted in the attached drawings once the known embodiment has been recalled.

In these drawings:

FIG. 1A is a vertical section through a brake fluid reservoir according to the state of the art, FIGS. 1B and 1C schematically depict characteristic steps in the method of assembling the reservoir, FIG. 2 is a plan view of a brake fluid reservoir part according to the invention, FIG. 3A is a vertical section through a brake fluid reservoir according to the invention, FIGS. 3B and 3C show the characteristic steps in the manufacture of the reservoir:

FIG. 3B shows the disengagement of the welding hotplate,

FIG. 3C shows the assembling of the two reservoir parts,

FIG. 4 is a plan view of the welding hotplate and of the line of contact of one reservoir part with one face of the welding hotplate, FIGS. 5A and 5B show one shape of edge of the gauging well elements prior to assembly of the reservoir and after assembly, FIGS. 6A and 6B show another shape of edge of the gauging well elements prior to assembly of the reservoir and after assembly of the reservoir, FIG. 7 shows another alternative shape of edge of gauging well elements.

DETAILED DESCRIPTION

To make the invention easier to understand, a reminder will first of all be given of the method used to assemble a reservoir according to the prior art, as depicted in FIGS. 1A-1C.

FIG. 1A shows a brake fluid reservoir 1 combined with a tandem master cylinder 2 depicted very schematically in outline form. The reservoir 1 is formed of two thermoweldable parts, an upper part 10 and a lower part 20. These two parts 10, 20 have outer walls 11, 21, partitions 12, 22 and gauging well elements 13, 23, which are homologous, and which are assembled by thermowelding along a parting line PS.

The reservoir 1 is connected to the tandem master cylinder 2 by the two outlet nozzles 14, 15 associated respectively with the primary chamber and with the secondary chamber of the tandem master cylinder 2. The reservoir 1 is filled via the inlet 16.

The reservoir 1 has a gauging well 4 formed by the assembly of the two well elements 13, 23 belonging respectively to the parts 10 and 20. It houses a level gauge 30 fitted with a float 31.

The main steps in the method of manufacturing the reservoir 1, the known one, will be described hereinafter:

According to FIG. 1B, the two parts 10, 20 are created by injection molding and will then be assembled with one another by welding the edges of the walls, partitions and well elements together.

To do that, each of the two parts 10, 20 is pressed simultaneously against the two faces 41, 42 of a welding hotplate 40 so as to cause the edge 11a, 21a, 12a, 22a, 13a, 23a of the walls, partitions and well elements to melt (FIG. 1C). The strip emphasized by cross-hatching provides a schematic depiction of the region of molten material at the edges of the walls, partitions and well elements of the two parts 10, 20 of the reservoir. The welding hotplate 40 is a hotplate coated with PTFE or some other non-stick material.

Next, when the plastic of the edges is in the molten state, the two parts 10, 20 are separated, the welding hotplate 40 is disengaged and the two parts 10, 20 are pressed against each other to join them together. This welding is manifested by a compression of the contacting edges, generating flash 11b, 12b, 13b. The flash 11b, 12b on the outer walls 11, 21 and the partitions 12, 22 is of no consequence to the operation of the reservoir, but in the region of the elements that form the gauging well 4, flash 13b in the well is something on which the float 31 of the level gauge 30 housed such that it can move in the well 4 can catch. This flash is likely to impede the behavior of the float, which will then carry the risk of generating erroneous signals. The flash is depicted in FIG. 1A in the form of bulges 11b, 12b, 13b on the finished reservoir 1.

The level gauge 30 is first of all installed in the well element 13 of the upper part 10 so that it will be trapped inside the gauging well once the reservoir 1 has been welded together. The gauge 30 is connected to an external connector 32 and generally works like a switch. The level gauge can also be installed in the lower part 20 if use is made of a reed switch that works with magnetic detection, in which case the float will carry a magnet.

FIG. 2 is a highly simplified plan view of part of the reservoir 1, either the upper part 10 or the lower part 20 given that these two parts, at least along the parting line PJ, have an identical outline in the case of the walls 11, 21, the partitions 12, 22 and the elements 13, 23 that form the gauging well. The reservoir part 10, 20 according to FIG. 2 is of rectangular cross section with two long sides and two short sides of the wall 11, 21 and transverse partitions 12, 22; the gauging well element 13, 23 is of cylindrical shape of circular cross section.

One embodiment of a reservoir 100 according to the invention is depicted in FIGS. 3A-3C.

According to FIG. 3A, the reservoir 100 is made up of two parts, an upper part 110 and a lower part 120 which are assembled to one another by thermowelding. The overall shape of the reservoir and of the constituent parts 110, 120 thereof is similar to that of the reservoir 1 of FIG. 1A. It comprises two outlet nozzles 114, 115 connected to the two inlets of the primary chamber and of the secondary chamber of the tandem master cylinder. It also has a level gauging well 104 housing a level gauge 130 with its float 131 and connected to an external connector 132.

FIGS. 3B and 3C schematically show the main steps of assembling the two brake fluid reservoir parts according to the invention.

According to FIG. 3B, injection welding is used to produce the two parts 110, 120 of the reservoir 100 with the walls 111, 121, the partitions 112, 122 and the well elements 113, 123.

The edges 111a, 121a; 112a, 122a of the sides 111, 121 and of the partitions 112, 122 are intended to be joined together except for the edges 113a, 123a of the elements 113, 123 that form the gauging well 104. These edges have been ringed on the drawing.

The edges 113a, 123a of the elements 113, 123 have a complementary structure which, by assembly under the pressure exerted by the walls and the partitions 111, 121; 112, 122 once they have been joined together, creates a fluid-tight joint between the two elements that form the gauging well 104.

Examples of edges of complementary shapes will be scrutinized later.

The two edges 113a, 123a of the elements 113, 123 are pressed together without these edges 113a, 123a being brought into a molten state when the edges 111a, 121a; 112a, 122a are melted in order to be thermally welded.

The compressing of the parts 110, 120 for thermowelding them causes the molten edges 111a, 121a; 112a, 122a to compact down, whereas the edges 113a, 123a, which are not molten, remain rigid and become compressed against one another.

According to the circumstances, it may be advantageous for one of the two elements 113, 123 to be made longer in relation to the length (or height) of the walls and partitions 111, 121; 112, 122 that define the parting line PJ.

If necessary, the extension is such that the total height of the two elements 113, 123 that make the gauging well 104 exceeds the sum of the heights of the two reservoir parts 110, 120 after assembly. Schematically, this height extension may be provided for one of the two elements 113, 123 but may also be provided for both elements which may extend beyond the parting line of the walls and partitions with a view to having an overall height after welding that exceeds the total height of the walls and partitions so that the edge of the elements 113, 123 that form the gauging well is under compression once the edges of the two housing parts 110, 120 have been welded together.

In general, the cross section of the edges of complementary shape of the two elements 113, 123 that in combination form the gauging well 104 is such that, under the effect of the compression, these two edges deform possibly out toward the exterior of the well but without forming any bulge or other protruding part that encroaches into the gauging well 104.

The way in which the reservoir 100 according to the invention is manufactured will be described hereinafter using FIGS. 3B and 3C.

According to FIG. 3B, the two parts 110, 120 are fitted into supports 151, 152 of a thermowelding installation. These supports may also be elements of the injection mold used to create the parts 110, 120 in order to bring together face to face the two reservoir parts 110, 120 previously manufactured in plastic by injection molding. Next, the welding hotplate 140 is introduced into the gap and the edge 111a, 121a; 112a, 122a of the walls and of the partitions is pressed against the two faces 141, 142 of the welding hotplate 140 in order to cause the edges 111a, 121a; 112a, 122a to melt without causing the edges 113a, 123a of the well elements 113, 123 to melt.

According to the invention, the welding hotplate 140, the faces of which are coated with PTFE for example, has a cut-out or recess 143 at the site of the two elements 113, 123 that form the gauging well. This cut-out 143 is sufficient in size that the edge of the well elements do not become melted by the hotplate 140.

Once only the edges 111a, 112a; 121a, 122a of the walls and partitions have been melted, the two parts 110, 120 are moved away slightly from the faces 141, 142 of the welding hotplate 140 so as to allow the welding hotplate to be extracted.

Next, the edges of the walls and partitions 111a, 121a; 112a, 122a of the two parts 110, 120 are pressed together to weld them by thermowelding. The edges 113a, 123a which have not been softened and are still rigid, belonging to the two elements 113, 123 that form the gauging well are, because of the compacting-down of the other edges, pressed against one another without welding, but in such a way as to create a fluid-tight compression joint. This compression does not cause any deformation of the edges 113a, 123a toward the interior of the gauging well.

The cross-hatched strips show the molten edges 111a, 121a; 112a, 122a while the edges 113a, 123a are not in contact with the hotplate 140 and are far enough away therefrom not to be heated and softened.

The bulges of welding 111b, 112b are shown in FIG. 3A.

FIG. 4 is a plan view of the hotplate 140 with its cut-out 143 consisting of a hole and the dotted line an outline of the lines where the parts 110, 120 of the reservoir press against the faces 141, 142 of the hotplate 140.

The thermowelding installation comprises, in addition to the welding hotplate 140, a support 151, 152 for each reservoir part 110, 120, to hold them or move them apart or closer together and a support 153 for the welding hotplate 140.

FIGS. 5A, 5B show a first embodiment of the cross section of the edges 113a, 123a of the well elements 113, 123 with complementary shapes. The edge 113a has a lip 116 and the other edge 123a has a flat surface. When the edges are brought closer together (FIG. 5B), the lip 116 is crushed and presses against the flat edge 123 of the other element to achieve a fluid-tight contact.

The length of this lip is such that whatever its deformation, it does not protrude toward the interior (I) of the gauging well 104, the axis of which is given schematically by the line ZZ.

FIGS. 6A and 6B show a second embodiment of the cross section of complementary shapes of the edges 113a, 123a of the elements 113, 123. In this embodiment, the element 113 has a lip 116 at its edge 113a, like in the first embodiment, but the edge 123a of the other element 123 is inclined toward the exterior so that following compression (FIG. 6B), the lip 16 deforms and can be directed only outwards, but depending on its length, may protrude toward the exterior. The interior of the well 104 is indicated by the letter (I) and its axis by ZZ.

The third embodiment is depicted in FIG. 7 during a process of assembly by compression. The element 113 has a straight lip 117 at its edge 113a, this lip being situated on the outside; on the inside, it has a step 117a. To complement this, the element 123 has, on its edge 123a, a lip 118 situated on the inside and a step 119a, on the outside, to accept the lip 117 and, by a reciprocal arrangement, the lip 118 fits into the step 117a. The positions of the inner (outer) lips of the two elements 113, 123 may also be reversed.

Other shapes which, combined with pressure, achieve fluid-tightness without protruding toward the interior (I) of the gauging well are also conceivable. In all cases, fluid-tightness is achieved by contact of parts placed under compression thereby forming a kind of labyrinth seal.

PARTS LIST

1 Known reservoir
2 Tandem master cylinder
4 Well
10, 20 Upper and lower parts
11, 21 Outer walls
11a, 21a Edges of the walls
12, 22 Partitions
12a, 22a Edges of the partitions
13, 23 Gauging well elements
13a, 23a Edges of the well elements
11b, 12b, 13b Flash
14, 15 Outlet nozzles
16 Inlet
30 Level gauge
31 Float
32 Connector
40 Welding hotplate
41, 42 Faces of the hotplate 40
100 Reservoir according to the invention
104 Well
110, 120 Upper and lower parts
111, 121 Outer walls
111a, 121a Edges
112, 122 Partitions
113, 123 Gauging well elements
114, 115 Outlet nozzles
117, 118 Lips
140 Welding hotplate
141, 142 Faces of the welding hotplate
151, 152 Supports
153 Welding hotplate support
PJ Parting line
I Interior of the gauging well

What is claimed is:

1. Brake fluid reservoir combined with a tandem master cylinder, comprising:

a gauging well, that is fluid-tight at least in a movement range of a float installed in the well for monitoring the brake fluid level in the reservoir and for generating a signal, the reservoir being formed of two parts, an upper part and a lower part, each of the parts being provided with partitions and well elements which, when the two parts are assembled, form compartments and the gauging well, the two parts each being made of a thermoweldable plastic so that they can be assembled with one another by thermowelding walls of the two parts and partitions that compartmentalize the reservoir, by pressing together edges that have been melted beforehand, characterized in that the walls (111, 121) and the partitions (112, 122) are assembled by thermowelding the edges together with the exception of the edges (113a, 123a) of the well elements (113, 123), and that the edge (113a) of the upper element (113) or the edge (123a) of the lower element (123) of the well (104) comprises a lip (116) and the edge of the other element (123, 113) of the well has a guide surface (123a) collaborating with the lip (116), the compression of the lip (116) achieving fluid-tight contact with the guide surface (123a), deformation of the lip toward the exterior of the gauging well (104) achieving a fluid-tight joint between the edges of the two well elements, without generating any projections toward the interior of the well produced by the assembly under the pressure exerted by the bringing-together and welding of the walls (111, 121) of the reservoir (100).

2. Brake fluid reservoir according to claim 1, characterized in that the upper element (113) and the lower element (123) of the gauging well have a height which, in combination, exceeds the height of the walls (111, 121) and of the partitions (112, 122) to be welded.

3. Thermowelding installation for creating a brake fluid reservoir according to claim 2, which reservoir is formed by using thermowelding to assemble the walls and partitions of the parts (110, 120) of the reservoir, which thermowelding is achieved by injecting thermoweldable plastic, the installation comprising a support to accept the upper part of the reservoir, a support to accept the lower part of the reservoir, these two supports facing one another, and a hotplate intended to be positioned between the two reservoir parts so that the edges of the walls and partitions of the two reservoir parts can be pressed against the hotplate in order to cause the edge of the two reservoir parts to melt partially, then the hotplate can be extracted from this gap and the two parts of the reservoir pressed together in order to weld them by thermowelding, characterized in that the hotplate (140) has a cut-out (143) along the line of the well elements (113, 123) so as to leave the edge (113a, 123a) of the well elements out of contact when the edge (111a, 121a) of the walls (111, 121) and that (112a, 122a) of the partitions (112, 122) of each of the reservoir parts (110, 120) is pressed against one face (141, 142) of the hotplate.

4. Thermowelding installation for creating a brake fluid reservoir according to claim 1, which reservoir is formed by using thermowelding to assemble the walls and partitions of the parts (110, 120) of the reservoir, which thermowelding is achieved by injecting thermoweldable plastic, the installation comprising a support to accept the upper part of the reservoir, a support to accept the lower part of the reservoir, these two supports facing one another, and a hotplate intended to be positioned between the two reservoir parts so that the edges of the walls and partitions of the two reservoir parts can be pressed against the hotplate in order to cause the edge of the two reservoir parts to melt partially, then the hotplate can be extracted from this gap and the two parts of the reservoir pressed together in order to weld them by thermowelding, characterized in that the hotplate (140) has a cut-out (143) along the line of the well elements (113, 123) so as to leave the edge (113a, 123a) of the well elements out of contact when the edge (111a, 121a) of the walls (111, 121) and that (112a, 122a) of the partitions (112, 122) of each of the reservoir parts (110, 120) is pressed against one face (141, 142) of the hotplate.

5. Brake fluid reservoir combined with a tandem master cylinder, comprising:

a gauging well, that is fluid-tight at least in a movement range of a float installed in the well for monitoring the brake fluid level in the reservoir and for generating a signal, the reservoir being formed of two parts, an upper part and a lower part, each of the parts being provided with partitions and well elements which, when the two parts are assembled, form compartments and the gauging well, the two parts each being made of a thermoweldable plastic so that they can be assembled with one another by thermowelding walls of the two parts and partitions that compartmentalize the reservoir, by pressing together edges that have been melted beforehand, characterized in that the walls (111, 121) and the partitions (112, 122) are assembled by thermowelding the edges together with the exception of the edges (113a, 123a) of the well elements (113, 123), and that an edge of the upper element (113) of the well (104) has a first lip and an edge of the lower element (123) of the well has a second lip of a cross section that at least substantially complements that of the first lip so that assembling the two edges under pressure achieves the fluid-tight contact.

6. Brake fluid reservoir according to claim 5, characterized in that one of the first and second lips is an inner (117) lip and the other of the first and second lips is an outer lip (118).

7. Thermowelding installation for creating a brake fluid reservoir according to claim 6, which reservoir is formed by using thermowelding to assemble the walls and partitions of the parts (110, 120) of the reservoir, which thermowelding is achieved by injecting thermoweldable plastic, the installation comprising a support to accept the upper part of the reservoir, a support to accept the lower part of the reservoir, these two supports facing one another, and a hotplate intended to be positioned between the two reservoir parts so that the edges of the walls and partitions of the two reservoir parts can be pressed against the hotplate in order to cause the edge of the two reservoir parts to melt partially, then the hotplate can be extracted from this gap and the two parts of the reservoir pressed together in order to weld them by thermowelding, characterized in that the hotplate (140) has a cut-out (143) along the line of the well elements (113, 123) so as to leave the edge (113a, 123a) of the well elements out of contact when the edge (111a, 121a) of the walls (111, 121) and that (112a, 122a) of the partitions (112, 122) of each of the reservoir parts (110, 120) is pressed against one face (141, 142) of the hotplate.

* * * * *